United States Patent
Zheng et al.

(10) Patent No.: US 9,430,305 B2
(45) Date of Patent: Aug. 30, 2016

(54) SERVER SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Sheng-Cun Zheng, Shenzhen (CN); He-Dong Lv, Shenzhen (CN); Hong-Lian Huang, Shenzhen (CN); Jian-She Shen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 70 days.

(21) Appl. No.: 14/478,179

(22) Filed: Sep. 5, 2014

(65) Prior Publication Data
US 2015/0074385 A1 Mar. 12, 2015

(30) Foreign Application Priority Data

Sep. 6, 2013 (CN) .......................... 2013 1 04015016

(51) Int. Cl.
*G06F 11/00* (2006.01)
*G06F 11/14* (2006.01)
*G06F 9/445* (2006.01)

(52) U.S. Cl.
CPC ............... *G06F 11/00* (2013.01); *G06F 8/665* (2013.01); *G06F 11/1417* (2013.01)

(58) Field of Classification Search
CPC .................................................. G06F 11/1417
See application file for complete search history.

(56) References Cited

U.S. PATENT DOCUMENTS

| | | | | |
|---|---|---|---|---|
| 7,484,084 | B1* | 1/2009 | Ranaweera | G06F 8/67 713/1 |
| 2004/0024917 | A1* | 2/2004 | Kennedy | G06F 9/4406 710/1 |
| 2007/0169088 | A1* | 7/2007 | Lambert | G06F 11/0709 717/168 |
| 2011/0119474 | A1* | 5/2011 | Singh | G06F 8/65 713/2 |
| 2012/0023320 | A1* | 1/2012 | Chen | G06F 11/0793 713/2 |
| 2012/0079260 | A1* | 3/2012 | Yin | G06F 11/1417 713/2 |
| 2012/0110379 | A1* | 5/2012 | Shao | G06F 11/1417 714/15 |
| 2012/0210165 | A1* | 8/2012 | Lambert | G06F 11/1417 714/15 |

* cited by examiner

*Primary Examiner* — Yolanda L Wilson
(74) *Attorney, Agent, or Firm* — ScienBiziP, P.C.

(57) ABSTRACT

A server system includes a PCH, a BMC, a BIOS with a write protect end, and a controlling circuit. The BIOS includes a write protect end. The BMC includes a memory portion storing updated server data. The BIOS is electrically connected to the PCH and is electrically connected to the BMC. The controlling circuit includes a first input end and an output end. The first input end is electrically connected to the PCH. The output end is electrically connected to the write protect end. The controlling circuit is configured so that when an error in the BIOS is detected, the write protect end is opened and the BIOS is updated from the memory portion of the BMC.

8 Claims, 3 Drawing Sheets

SERVER SYSTEM

FIELD

The subject matter herein generally relates to a server system and, particularly, to a server system with a controlling circuit.

BACKGROUND

A baseboard management controller (BMC) is a specialized microcontroller embedded on a motherboard of a server system. The BMC is configured to monitor parameters of servers in the server system such as temperature or power status, and to send alerts to a system administrator via the network if any of the parameters do not stay within preset limits, indicating a potential failure of a basic input/output system (BIOS) of the server system.

BRIEF DESCRIPTION OF THE DRAWINGS

Implementations of the present technology will now be described, by way of example only, with reference to the attached figures.

DETAILED DESCRIPTION

Figure 1:
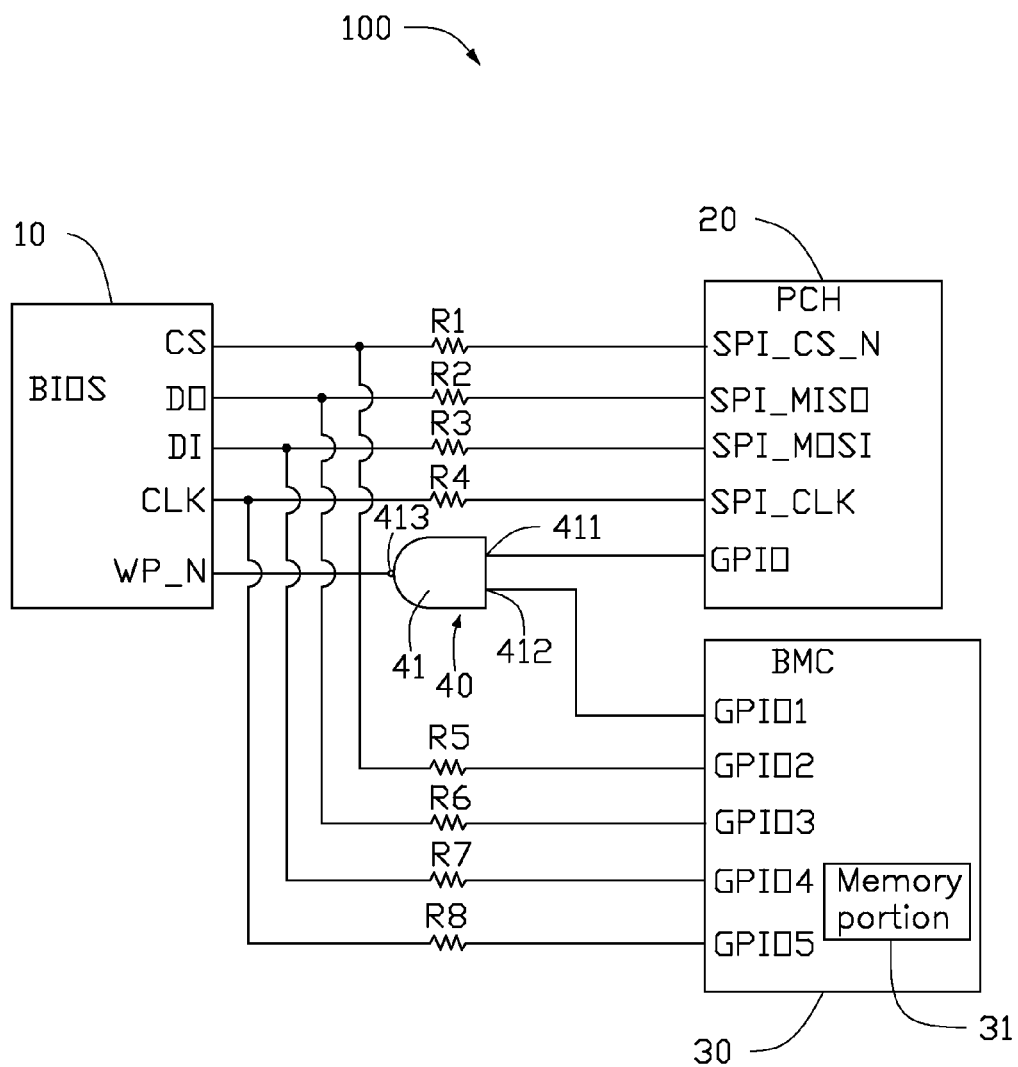
FIG. 1 is a diagrammatic view of an example embodiment of a server system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A definition that applies throughout this disclosure will now be presented.

The term "comprising," means "including, but not necessarily limited to" and specifically indicates open-ended inclusion or membership in the so-described combination, group, series and the like.

A server system includes a PCH, a BMC, a BIOS with a write protect end, and a controlling circuit. The BIOS includes a write protect end. The BMC includes a memory portion storing updated server data. The BIOS is electrically connected to the PCH and is electrically connected to the BMC. The controlling circuit includes a first input end and an output end. The first input end is electrically connected to the PCH. The output end is electrically connected to the write protect end. The controlling circuit is configured so that when an error in the BIOS is detected, the write protect end is opened and the BIOS is updated from the memory portion of the BMC.

FIG. 1 illustrates an example embodiment of a server system 100. The server system 100 includes a BIOS 10, a platform controller hub (PCH) 20, a BMC 30, and a controlling circuit 40.

The BIOS 10 is configured to store basic input/output programs, system setting information, boot to electricity self-inspection programs, and system startup bootstrap programs. The BIOS 10 includes a chip select signal input end CS, a data output end DO, a data input end DI, a clock signal end CLK, and a write protect end WP_N.

The PCH 20 is a chip and exchange information with peripherals in a manner that serial peripheral interface (SPI) buses are connected to the peripherals in serial. In one embodiment, the PCH 20 includes a chip select signal bus SPI_CS_N, an input data bus SPI_MISO, an output data bus SPI_MOSI, a serial clock bus SPI_CLK, and a general input/output end GPIO. The chip select signal bus SPI_CS_N is electrically connected to the chip select signal input end CS via a first resistor R1. The input data bus SPI_MISO is electrically connected to the data output end DO via a second resistor R2. The output data bus SPI_MOSI is electrically connected to the data input end DI via a third resistor R3. The serial clock bus SPI_CLK is electrically connected to the clock signal end CLK via a fourth resistor R4.

In another embodiment, the first resistor R1, the second resistor R2, the third resistor R3, and the fourth resistor R4 can be omitted. In other words, the chip select signal bus SPI_CS_N can be directly electrically connected to the chip select signal input end CS. The input data bus SPI_MISO can be directly electrically connected to the data output end DO. The output data bus SPI_MOSI can be directly electrically connected to the data input end DI. The serial clock bus SPI_CLK can be directly electrically connected to the clock signal end CLK.

The BMC 30 is configured to monitor and manage other devices in the server system 100, such as a central processing unit (CPU), disks, or a power supply, independently of the host's operating system, for instance, DOS, Windows, or Linux. The BMC 30 is made self-provided power supply. In particular, the BMC 30 executes the monitor and management task using a standby power in the server system 100.

In detail, the BMC 30 includes a memory portion 31, a first programmable pin GPIO1, a second programmable pin GPIO2, a third programmable pin GPIO3, a fourth programmable pin GPIO4, and a fifth programmable pin GPIO5. The memory portion 31 is configured to store updated server data of the server system 100 including update basic input/output programs, update system setting information, update boot to electricity self-inspection programs, and update system startup bootstrap programs. In one embodiment, the memory portion 31 is an electrically erasable programmable read-only memory (EEPROM).

The first programmable pin GPIO1 is a write protect pin. The second programmable pin GPIO2 is a chip select signal pin and is electrically connected to the chip select signal input end CS via a fifth resistor R5. The third programmable pin GPIO3 is a data input pin and is electrically connected to the data output end DO via a sixth resistor R6. The fourth programmable pin GPIO4 is a data input pin and is electrically connected to the data input end DI via a seventh resistor R7. The fifth programmable pin GPIO5 is a data output pin and is electrically connected to the clock signal end CLK via an eighth resistor R8.

In another embodiment, the fifth resistor R5, the sixth resistor R6, the seventh resistor R7, and the eighth resistor R8 can be omitted. In other words, the second programmable pin GPIO2 is directly electrically connected to the chip select signal input end CS. The third programmable pin GPIO3 is directly electrically connected to the data output end DO. The third programmable pin GPIO3 is directly electrically connected to the data input end DI. The fourth programmable pin GPIO4 is directly electrically connected to the clock signal end CLK.

The controlling circuit 40 is configure to control the write protect end WP_N to open and close. The controlling circuit 40 includes a Negated AND or NOT AND (NAND) gate 41. The NAND gate 41 includes a first input end 411, a second input end 412, and an output end 413. The first input end 411 is electrically connected to the input/output end GPIO. The second input end 412 is electrically connected to the first programmable pin GPIO1. The output end 413 is electrically connected to the write protect end WP_N.

Figure 2:
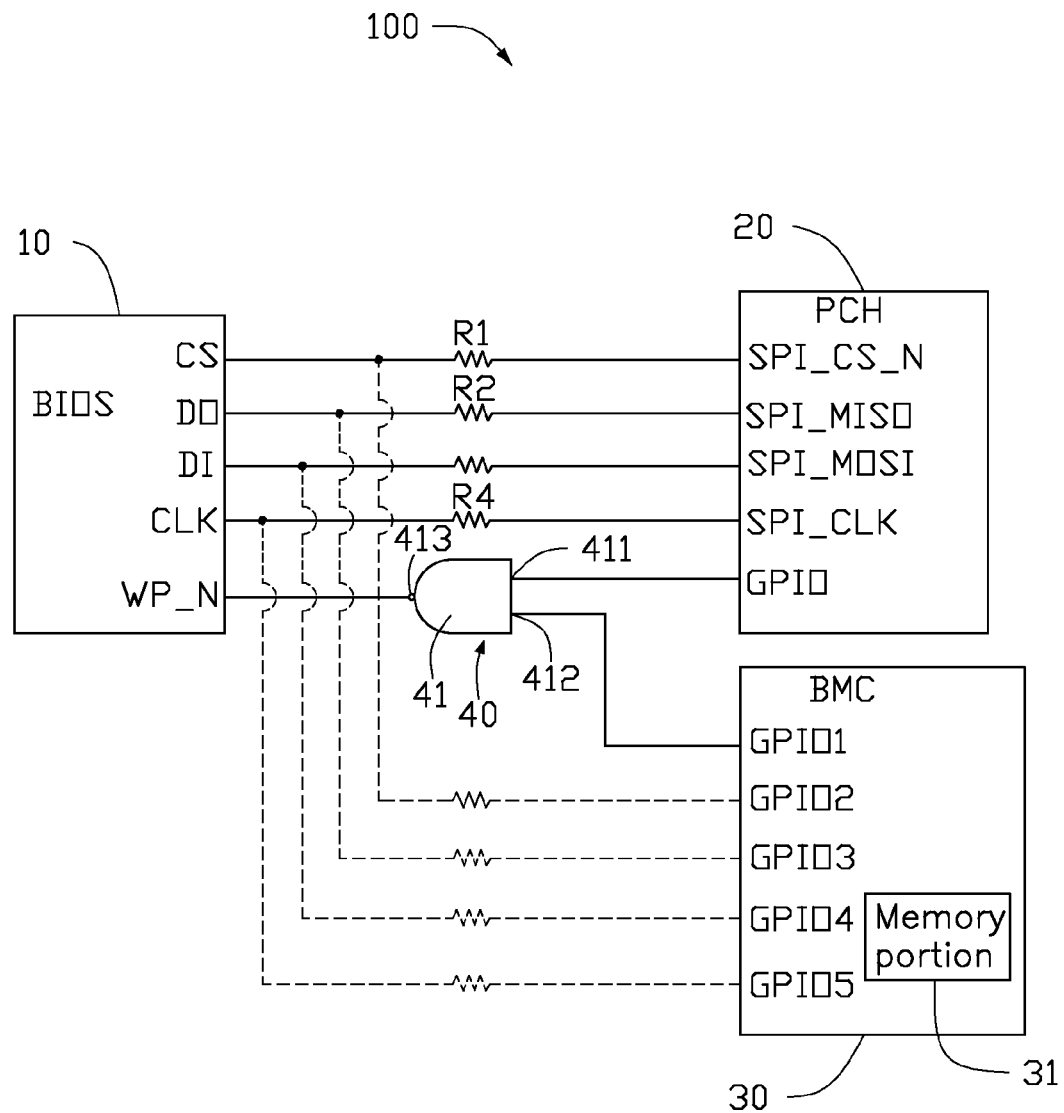
FIG. 2 is a diagrammatic view showing the server system of FIG. 1 in a first work state.

FIG. 2 illustrates a first work state of the server system 100. When the basic input/output programs, the system setting information, the boot to electricity self-inspection programs, and the system startup bootstrap programs stored in the BIOS 10 are complete and the server system 100 can normal work, a chip select signal in the PCH 20 is transmitted to the chip select signal input end CS via the chip select signal bus SPI_CS_N, a clock signal in the PCH 20 is transmitted to the clock signal end CLK via the serial clock bus SPI_CLK, data in the data output end DO is transmitted to the PHC 20 via the output data bus SPI_MOSI, and data in the data input end DI is transmitted to the PHC 20 via the output data bus SPI_MOSI, thereby the PCH 20 capturing the basic input/output programs, the system setting information, the boot to electricity self-inspection programs, and the system startup bootstrap programs stored in the BIOS 10 and making the server system 100 startup. Simultaneously, the first programmable pin GPIO1 outputs the high level, all of the second programmable pin GPIO2, the third programmable pin GPIO3, the fourth programmable pin GPIO4, and the fifth programmable pin GPIO5 output the low level, and the input/output end GPIO outputs the high level. It is understood that when the input/output end GPIO outputs the low level, the write protect end WP_N is opened. The BMC 30 can erase the BOIS 10 and update the basic input/output programs, the system setting information, the boot to electricity self-inspection programs, and the system startup bootstrap programs stored in the BIOS 10 using the update basic input/output programs, the update system setting information, the update boot to electricity self-inspection programs, and the update system startup bootstrap programs stored in the memory portion 31.

Figure 3:
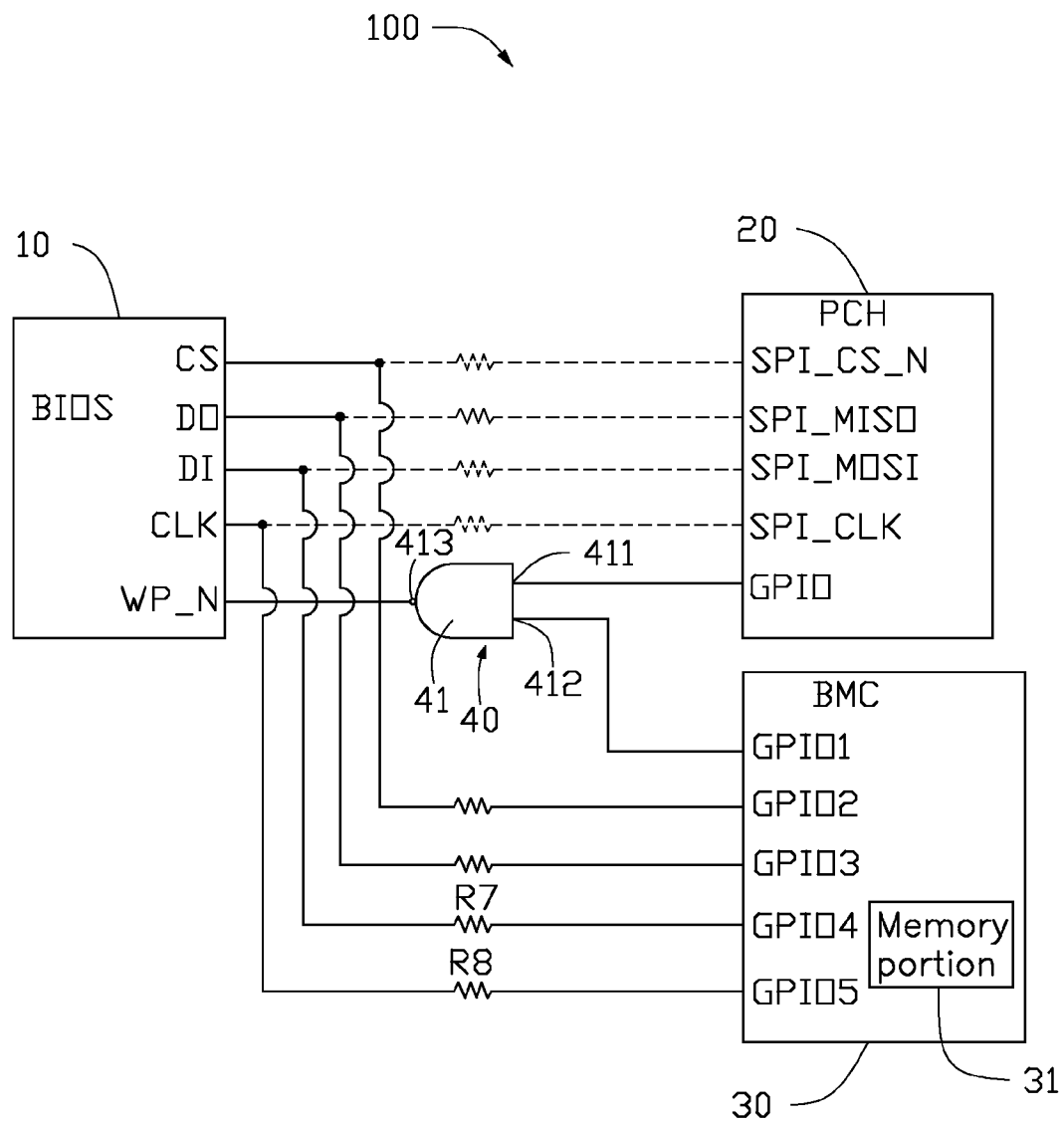
FIG. 3 is a diagrammatic view showing the server system of FIG. 1 in a second work state.

FIG. 3 illustrates a second work state of the server system 100. When an error of the basic input/output programs, of the system setting information, of the boot to electricity self-inspection programs, or of the system startup bootstrap programs stored in the BIOS 10 is detected, the PCH 20 cannot capture the right basic input/output programs, the right system setting information, the right boot to electricity self-inspection programs, and the right system startup bootstrap programs stored in the BIOS 10, and the server system 100 cannot startup. In this situation, the BMC 30 can recover the basic input/output programs, the system setting information, the boot to electricity self-inspection programs, and the system startup bootstrap programs stored in the BIOS 10. In detail, the first programmable pin GPIO1 outputs the low level to open the write protect end WP_N. An effective chip select signal in the BMC 30 is transmitted to the chip select signal input end CS via the second programmable pin GPIO2, a effective clock signal in the BMC 30 is transmitted to the clock signal end CLK via the fifth programmable pin GPIO5, data in the data output end DO is transmitted to the BMC 30 via the third programmable pin GPIO3, and data in the data input end DI is transmitted to the BMC 30 via the fourth programmable pin GPIO4, thereby updating the information of the BIOS 10 using the update basic input/output programs, the update system setting information, the update boot to electricity self-inspection programs, and the update system startup bootstrap programs stored in the memory portion 31.

The embodiments shown and described above are only examples. Many details are often found in the art such as the other features of a server system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A server system comprising:
   a platform controller hub;
   a baseboard management chip having a memory portion, the memory portion storing updated server data;
   a basic input/output system with a write protect end, the basic input/output system electrically connected to the platform controller and electrically connected to the baseboard management system; and
   a controlling circuit with a first input end electrically connected to the platform controller hub, and an output end electrically connected to the write protect end of the basic input/output system;
   wherein, the controlling circuit is configured so that when an error in the basic input/output system is detected, the write protect end is opened and the basic input/output system is updated from the memory portion of the baseboard management system;
   wherein, the basic input/output system further comprises chip select signal input end, the platform controller hub comprises a chip select signal bus connected to the chip select signal input end, the baseboard management chip further comprises a second programmable pin, and the second programmable pin is a chip select signal pin and is electrically connected to the chip select signal input end.

2. The server system of claim 1, wherein the platform controller hub comprises a general input/output end, the basic input/output system comprises a first programmable pin, the first programmable pin is a write protect pin, the controlling unit comprises a Negated AND or NOT AND (NAND) gate, the NAND gate comprising the first input end, a second input end, and the output end, the first input end electrically connected to the general input/output end, the second input end electrically connected to the first programmable pin, the general input/output end outputs the low level, and the output end outputs the high level, thereby opening the write protect end when an error in the basic input/output system is detected.

3. The server system of claim 1, wherein the basic input/output system further comprises a data output end, the platform controller hub comprises an input data bus, and the input data bus is electrically connected to the data output end.

4. The server system of claim 3, wherein the baseboard management chip further comprises a third programmable pin, and the third programmable pin is a data input pin and is electrically connected to the data output end.

5. The server system of claim 1, wherein the basic input/output system further comprises a data input end, the platform controller hub comprises an output data bus, and the output data bus is electrically connected to the data input end.

6. The server system of claim 1, wherein the basic input/output system further comprises a clock signal end, the platform controller hub comprises a serial clock bus, and the serial clock bus is electrically connected to the clock signal end.

7. The server system of claim 6, wherein the baseboard management chip further comprises a fifth programmable pin, and the fifth programmable pin is a data output pin and is electrically connected to the clock signal end.

8. The server system of claim 1, wherein the memory portion is an electrically erasable programmable read-only memory.

* * * * *